(12) United States Patent
Chapman

(10) Patent No.: US 9,260,045 B2
(45) Date of Patent: Feb. 16, 2016

(54) CAMERA CRANE TRANSPORT VEHICLE

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 830 days.

(21) Appl. No.: 13/488,751

(22) Filed: Jun. 5, 2012

(65) Prior Publication Data

US 2013/0322996 A1  Dec. 5, 2013

(51) Int. Cl.
| | |
|---|---|
| *B60P 1/43* | (2006.01) |
| *B60P 3/28* | (2006.01) |
| *B60P 3/07* | (2006.01) |
| *B66F 11/04* | (2006.01) |

(52) U.S. Cl.
CPC .............. *B60P 1/433* (2013.01); *B60P 1/435* (2013.01); *B60P 3/07* (2013.01); *B60P 3/28* (2013.01); *B66F 11/048* (2013.01)

(58) Field of Classification Search
CPC .......... B66F 11/048; B66F 7/08; B66F 11/04; B66F 11/044; B66F 9/06; B66F 9/065; B66F 9/07; B66F 9/12; B66F 9/127; B66F 7/06; B66F 7/10; B66F 7/243; B66F 7/26; B60P 1/435; B60P 3/07; B60P 3/08; B60P 3/28; B60P 1/02; B60P 1/43; B60P 1/431; B60P 1/4414; B60P 1/4421; B60P 1/433; B60P 1/022; B60P 1/025; B60P 1/44; B60P 1/50; B64F 1/32; B62B 5/0083; A61G 3/06; A61G 3/062; A61G 3/066; A61G 2220/16
See application file for complete search history.

(56) References Cited

U.S. PATENT DOCUMENTS

| | | | | |
|---|---|---|---|---|
| 1,878,995 | A * | 9/1932 | Abbe | 414/639 |
| 2,058,891 | A * | 10/1936 | Kellett | 410/66 |
| 2,359,961 | A * | 10/1944 | Anthony | 254/2 R |
| 2,492,829 | A * | 12/1949 | Baker | 410/28.1 |
| 2,900,094 | A * | 8/1959 | Ferguson | 414/537 |
| 3,720,437 | A * | 3/1973 | Lambert | 410/29.1 |
| 3,722,716 | A * | 3/1973 | Tantlinger | 414/391 |
| 3,730,361 | A * | 5/1973 | Haynes | 414/537 |
| 3,795,333 | A * | 3/1974 | Tebben | 414/537 |

(Continued)

FOREIGN PATENT DOCUMENTS

| | | | |
|---|---|---|---|
| EP | 2347992 A1 | * | 7/2011 |
| JP | 2004262396 A | | 9/2004 |
| JP | 2012035676 A | | 2/2012 |

OTHER PUBLICATIONS

Korean Intellectual Property Office, International Search Report and Written Opinion mailed Aug. 23, 2013 in International Application No. PCT/US2013/042733.

*Primary Examiner* — Glenn Myers
(74) *Attorney, Agent, or Firm* — Kenneth H. Ohriner; Perkins Coie LLP

(57) ABSTRACT

A camera crane carrier includes a vehicle having a front end and a back end. A front elevator is movable vertically between up and down positions, at a forward position on a deck vehicle. A back elevator is movable vertically between up and down positions, at a rearward position, below the deck. A ramp may be provided on the vehicle, with the ramp extendible from the deck at the back end of the vehicle to the ground. The elevators allow a camera crane to be more easily loaded onto the vehicle, and also allow lowering the center of gravity of the loaded vehicle. The vehicle may optionally be used as a camera car when not carrying a camera crane.

16 Claims, 10 Drawing Sheets

(56) References Cited

U.S. PATENT DOCUMENTS

| | | | |
|---|---|---|---|
| 3,866,771 A * | 2/1975 | Reid et al. | 414/537 |
| 4,144,979 A * | 3/1979 | Leach et al. | 414/537 |
| 4,155,468 A * | 5/1979 | Royce | 414/556 |
| 4,565,291 A | 1/1986 | Khirwadkar | |
| 5,145,310 A * | 9/1992 | Calzone | 414/537 |
| 5,630,693 A * | 5/1997 | Sobina | 414/495 |
| 5,678,984 A * | 10/1997 | Petersen | 414/537 |
| 6,173,941 B1 * | 1/2001 | Johnston | 254/89 H |
| 6,186,734 B1 * | 2/2001 | Maurer | 414/537 |
| 6,345,943 B1 * | 2/2002 | Lawson et al. | 410/29.1 |
| 2002/0012575 A1 * | 1/2002 | Pawluk | 410/24 |
| 2003/0160221 A1 | 8/2003 | Dunbar, Sr. et al. | |
| 2005/0173601 A1 * | 8/2005 | Hestand | 248/129 |
| 2005/0220595 A1 * | 10/2005 | Hull | 414/537 |
| 2006/0083597 A1 | 4/2006 | Chang | |
| 2008/0030004 A1 * | 2/2008 | Rempel | 280/656 |
| 2008/0131245 A1 * | 6/2008 | Paproski | 414/393 |
| 2009/0078502 A1 * | 3/2009 | Knurr | 182/13 |
| 2010/0101460 A1 * | 4/2010 | Kelly et al. | 108/55.3 |

* cited by examiner

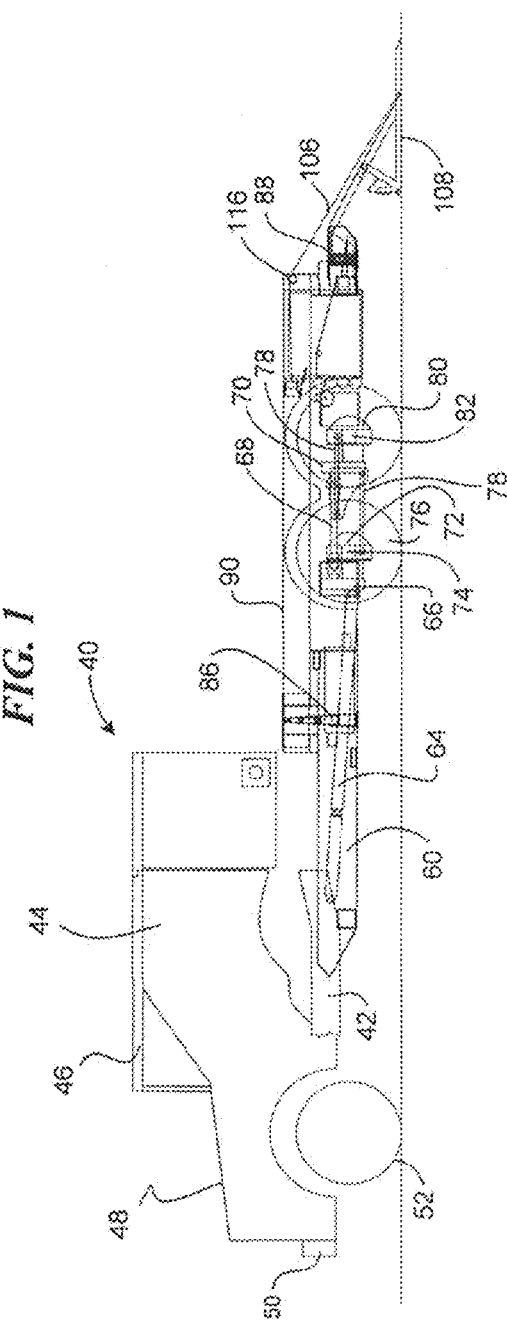
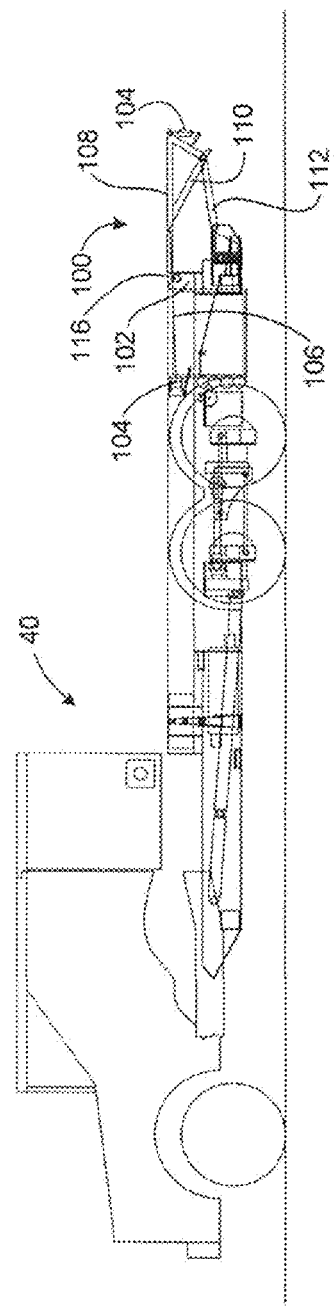

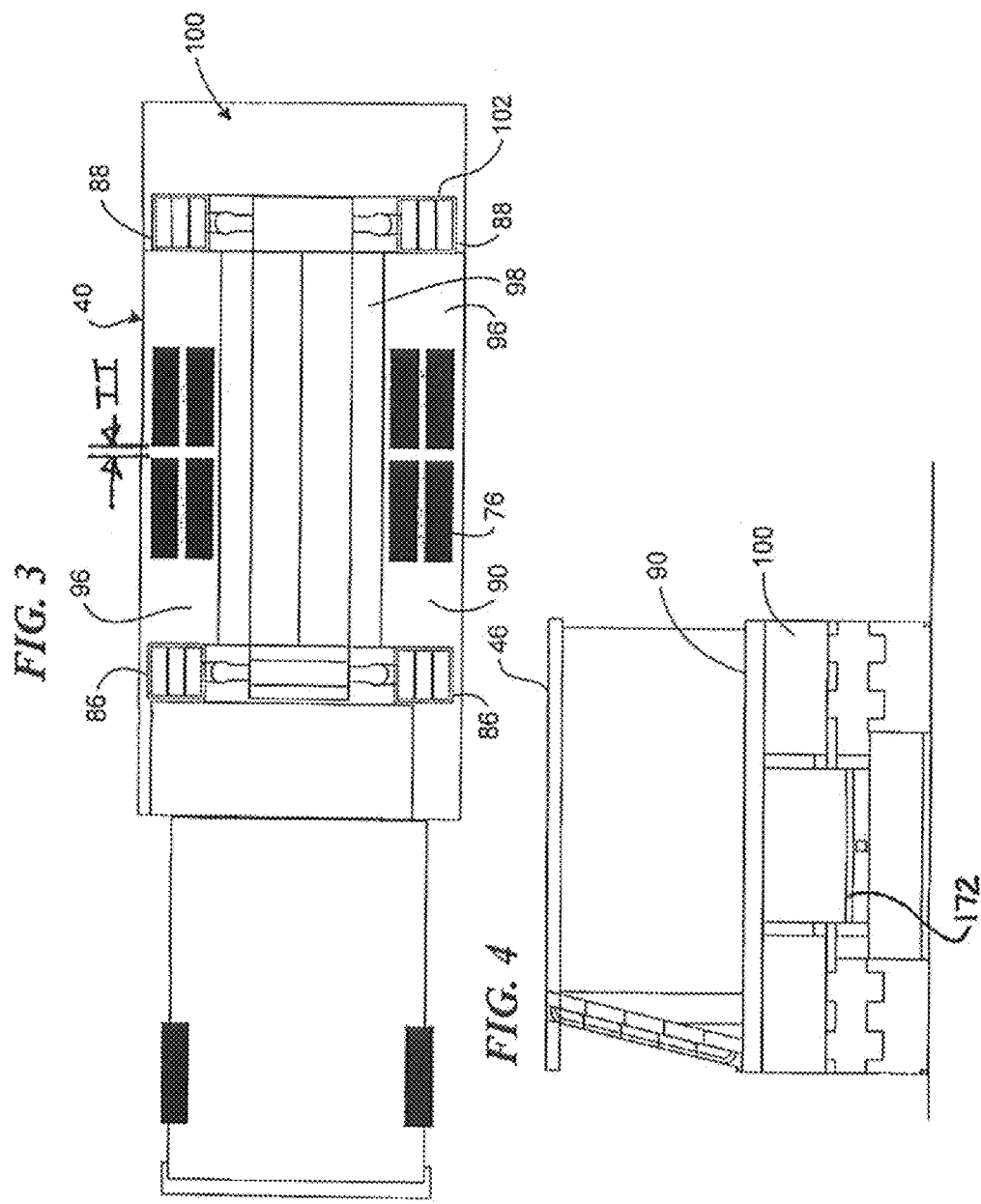

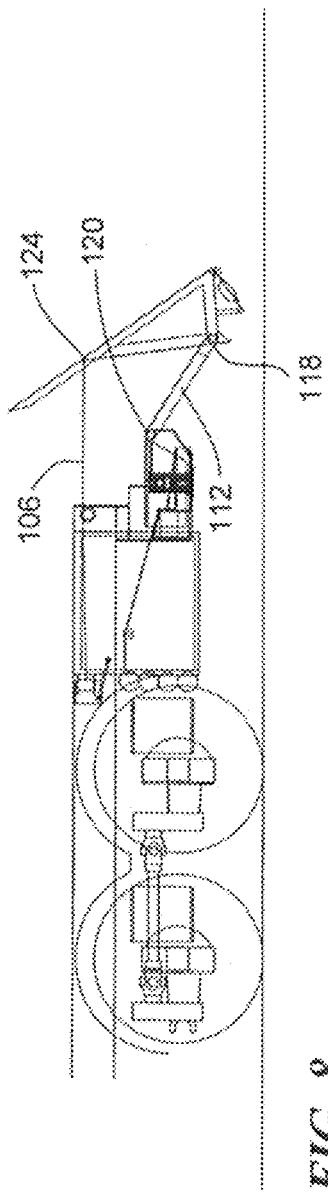
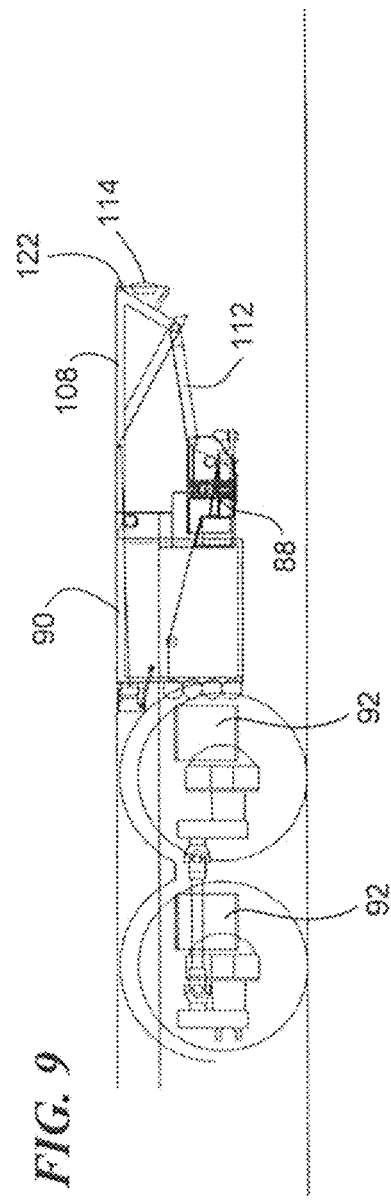

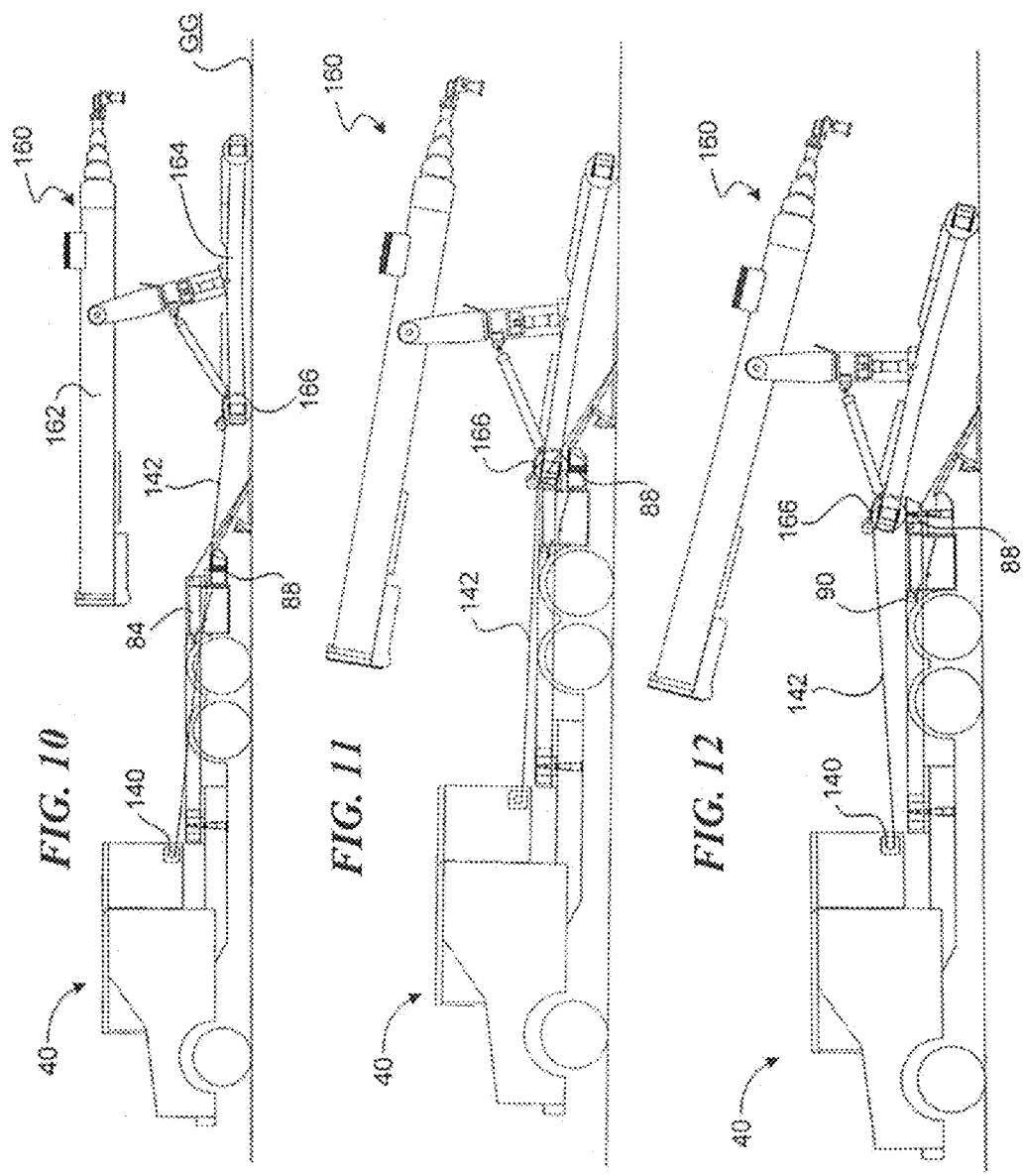

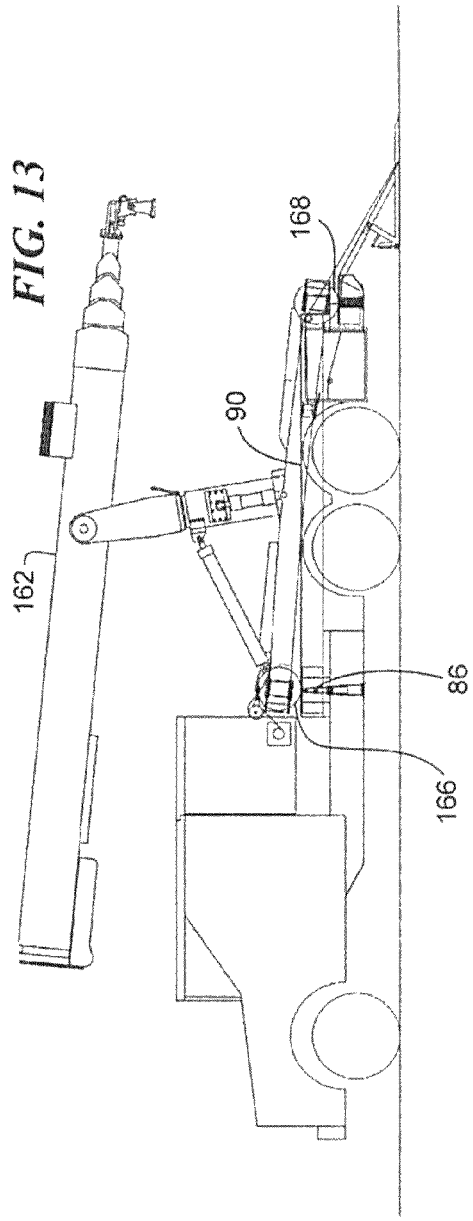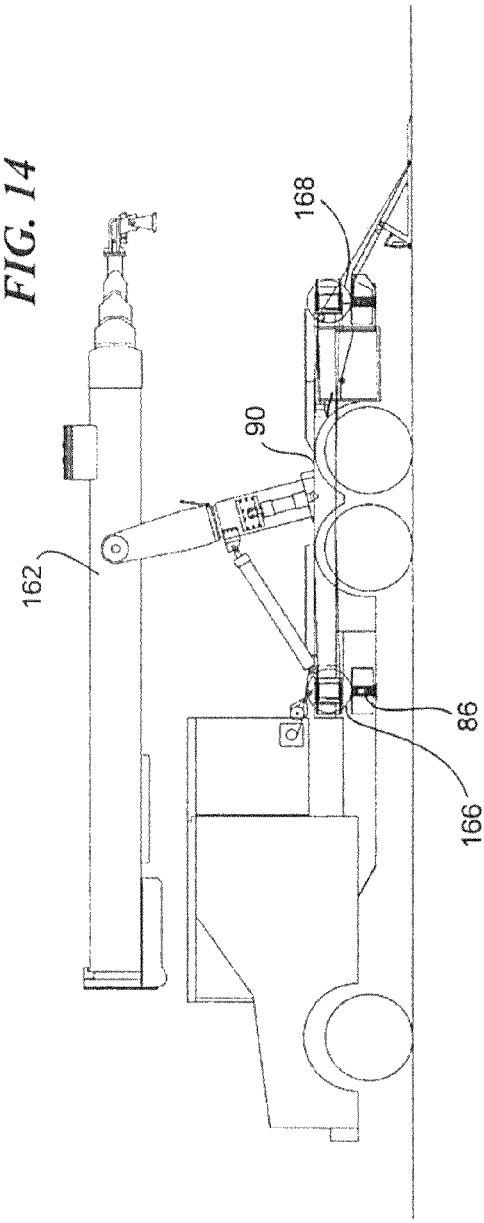

CAMERA CRANE TRANSPORT VEHICLE

BACKGROUND OF THE INVENTION

Camera cranes are used to position and maneuver motion picture cameras, such as motion picture film or digital cameras, HD cameras, and 2D and 3D cameras. Camera cranes typically have a crane arm mounted onto a mobile base or vehicle. The arm can be pivoted or tilted up or down, and panned from side to side, to obtain a desired camera position, while the mobile base remains stationary. Some crane arms can extend and retract with a telescoping movement. To follow a moving subject during filming, or to move the camera around a subject, move in, back-up or move diagonally in any direction, the motion base is pushed over the ground by the filming crew, or the motion base may be self-propelled via an on-board motor, with or without also using telescoping movement. Dramatic improvements in telescoping camera crane arms have recently been achieved, for example as described in U.S. Pat. No. 8,033,742. This type of camera crane arm can provide a reach of over 70 feet (23 meters) with exceptional stability, all weather, and underwater capability.

As filming often takes place on location outside of a studio, camera cranes are frequently transported by truck to the filming location. However, the relatively larger size and weight of modern camera cranes present special transport challenges.

SUMMARY OF THE INVENTION

A camera crane carrier includes a vehicle having a front elevator movable vertically between up and down positions, at a forward position on a deck of the vehicle. A back elevator is movable vertically between up and down positions, at a rearward position, below the deck. A ramp may be provided on the vehicle, with the ramp extendible from the deck at the back end of the vehicle to the ground. The elevators allow a camera crane to be more easily loaded onto the vehicle, and also allow lowering the center of gravity of the loaded vehicle. The vehicle may optionally be used as a camera car when not carrying a camera crane.

BRIEF DESCRIPTION OF THE DRAWINGS

In the drawings, the same reference number indicates the same element in each of the views.

FIG. 1 is a side view of a camera crane transport vehicle with a tailgate ramp deployed.

FIG. 2 is a side view of the camera crane transport vehicle of FIG. 1 with the tailgate ramp folded.

FIG. 3 is a plan view of the camera crane transport vehicle shown in FIG. 1.

FIG. 4 is a rear view of the camera crane transport vehicle shown in FIG. 1.

FIGS. 5-9 are side views showing a sequence of operation of the tailgate ramp shown in FIGS. 1 and 2.

FIGS. 10-15 are side views showing a sequence of operation of the camera crane transport vehicle shown in FIG. 1.

DETAILED DESCRIPTION OF THE DRAWINGS

Figure 5:
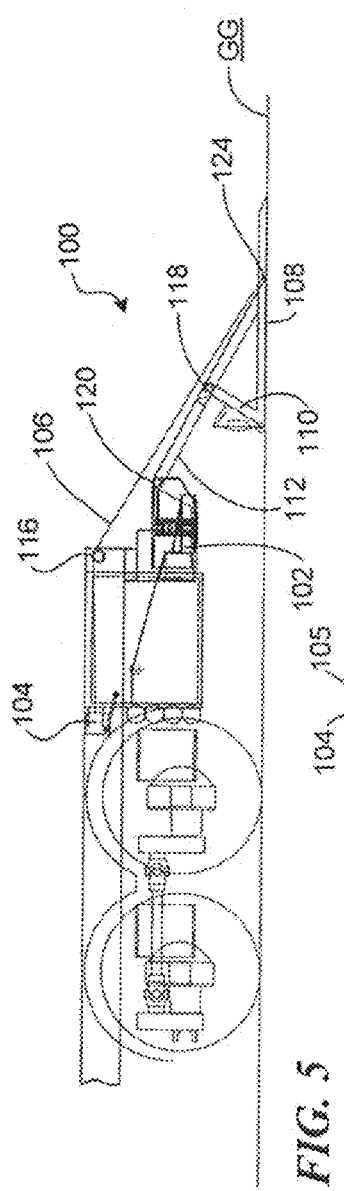

A camera crane typically includes a crane arm, for example as described in U.S. Pat. No. 8,033,742 mounted on a mobile base, for example as described in U.S. Patent Application 2012/0026467, both incorporated herein by reference. As camera cranes may weigh over 10,000 lbs (4545 kg) and have a high center of gravity, loading and transporting camera cranes on conventional over-the-road trucks can be difficult. FIG. 1 shows an improved vehicle for loading and transporting large camera cranes.

As shown in FIG. 1, a camera crane transport vehicle 40 has a cab 44 on a front chassis 42. Since the vehicle 40 may also be used as a camera car, a cab deck 46 may be provided on top of the cab 44, to allow camera crew to more securely climb or stand on top of the cab, without damaging the vehicle. A hood deck 48 may similarly be provided on the hood of the vehicle 40. Front platform fittings 50 may be attached to the chassis 42 to allow a front platform to be attached to the vehicle 40, for camera car operations. A standard truck, such as a Ford 550 or similar, may be used to provide the front section of the vehicle 40, including the cab 44, the engine, steering and front drive wheels 52, and the front chassis 42. The rear section of the vehicle 40 may be made with a reinforced rear chassis 60 to better handle loads beyond the specifications of the standard truck. The rear chassis 60 is joined to the front chassis 42 via welding or bolting. Of course, a single purpose-built chassis may also be used.

In the design shown in FIG. 1, the vehicle 40 has two rear axles, with dual wheel pairs on each side, for a total of eight rear wheels 76, along with the two front wheels 52. All 10 wheels of the vehicle 40 may be linked to the vehicle drive train, to allow the vehicle to better move over soft or slippery ground, or handle steep inclines, as is often required to deliver the camera crane to the filming location. A standard truck, such as the Ford F550, may be modified for this purpose by adding a second rear axle.

In this design, the stock drive shaft 64 is connected to a front transfer case 66, which drives a front axle set 74 through a front differential 72. The front differential drives the forward four wheels 76 on the front axle set 74. The front transfer case also drives a transfer shaft 68 that connects the front transfer case 66 to a rear transfer case 70. The rear transfer case 70 drives the rear four wheels 76 on the second rear axle set 82 via the rear differential 80. Stabilizer bars 78 may be used to reduce twisting movements of the drive line components. All of the axles may be attached to the chassis via air bags or air springs 92. For added stability, for example in high winds, the air springs 92 may be deflated sufficiently to allow the chassis to rest on the axles via a direct hard connection (e.g., metal-to-metal).

The rear axles may be positioned close together, for example with a tire clearance TT shown in FIG. 3 of less than 6, 5 or 4/12 inches. This reduces tire scrubbing as the vehicle turns. Under certain conditions, for example when moving over soft ground such as sand, the tires may be deflated for improved traction. However, the lower air pressure in the deflated tires reduces the friction forces holding the tire onto the rim. Under high torque/low tire pressure conditions, the wheel may slip within the tire. To prevent this occurrence, the tires may optionally be pinned or bolted to the wheels. For example, bolts may be placed through holes in thick sidewall areas of the tires, to lock the tire onto the wheel.

As shown in FIGS. 1 and 3, the vehicle 40 includes a front elevator 86 and a rear elevator 88. The elevators 86 and 88 may each be provided as separate left and right lift devices, such as hydraulic cylinders. Alternatively, a single front and a single rear elevator may raise and lower a single lateral plate extending across the vehicle 40. A deck 90 is supported on top of the chassis 60. The deck 90 includes laterally spaced apart rollways 96 generally matching the lateral wheelbase of the camera crane 160, as shown in FIG. 3. The rollways 96 are flat structural surfaces that can support the weight of the camera crane 160 as it is loaded onto the vehicle 40. The areas 98 of the deck 90 between the rollways 96 may be at the same level as the rollways 96. In this case, the deck 90 provides a generally flat open platform to allow use of the vehicle 40 as a camera car when the vehicle 40 is not carrying a camera crane. Various types of fittings and receptacles may be provided on the deck 90 to allow installation of camera car accessories, such as support or safety bars, frames, gates, and extensions.

FIGS. 5-9 show operation of the tailgate ramp 100 show in FIG. 1. The terms front and back refer to the tailgate ramp 100 in the unfolded or deployed position shown in FIG. 5. FIGS. 5-9 show the left side of the vehicle 40, with corresponding elements generally on the right side as well, so that the vehicle and components described may be provided in a substantially symmetrical arrangement. Referring to FIG. 5, the tailgate ramp 100 may include a ground plate 108 on a triangle frame 110. The triangle frame 110 may be pivotally attached to the back end of a link plate 112 at a link pivot joint 118. The front end of the link plate 112 may be pivotally attached to a rear sub-deck 102 via a gate pivot joint 120. The sub-deck 102 is vertically below the level of the deck 90. Caster wheels 122 may be provided at the front end of the ground plate 108, to allow the triangle frame 110 to roll on the ground GG during fold/unfold operation of the tailgate ramp 100. Tail lights 114 along with brake lights and/or other vehicle components may be attached to the front end of the triangle frame 110.

From the deployed position shown in FIG. 5, the tailgate ramp 100 is moved into a folded position as shown in FIG. 9 as follows. A tailgate cable 106 on a tailgate winch 104 is attached to a cable anchor 124 of the ground plate 108 or other position on the triangle frame 110. The tailgate winch 104 may be operated manually via a handle crank 105, or it may be electrically or hydraulically powered. However, as the tailgate ramp folding/unfolding operation is performed with no load on the tailgate ramp 100, a powered winch generally should not be needed.

Figure 6:
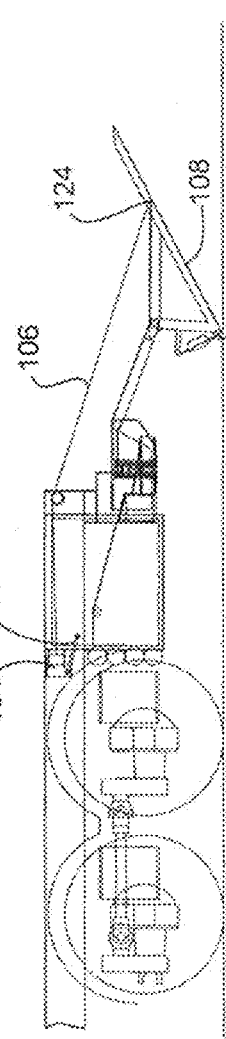
Figure 7:
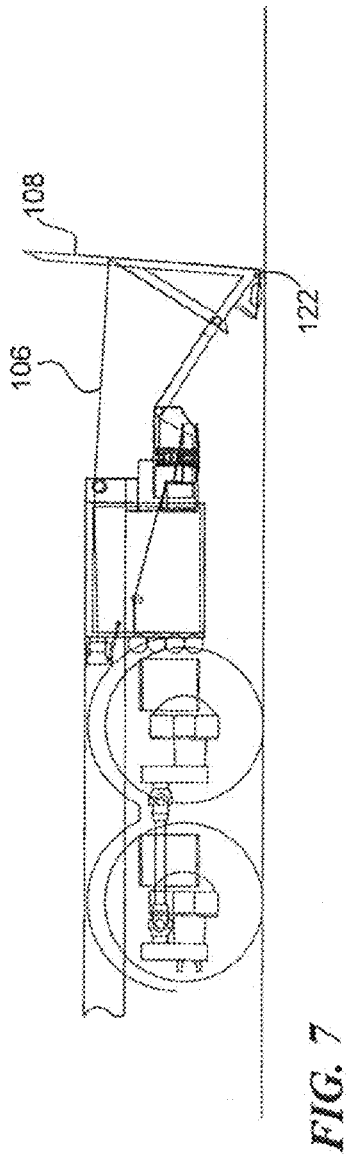

Turning to FIG. 6, the tailgate winch 104 pulls on the cable 106 causing the back end of the ground plate 108 to lift off of the ground with the triangle frame 110 rotating counterclockwise. As shown in FIGS. 6 and 7, the caster wheels 122 roll on the ground as the ground plate 108 continues to rotate through an upright position. Pulleys 116 may be used to position the winch cables on each side of the tailgate ramp 100. Referring to FIG. 9, as the winch 104 continues to draw the cables 106 in, the triangle frame 110 pivots about link pivot joint 118 and lifts up and off of the ground GG. At the same time the link plate 112 pivots about the gate pivot joint 120.

FIG. 9 shows the tailgate ramp 100 in the completely folded position. The back end of the ground plate 108 rests on stops, with the now up-facing bottom surface of the ground plate 108 generally flush with the deck 90. The folded tailgate ramp 100 can then act as an extension of the deck 90 when the vehicle 40 is used as a camera car. As shown in FIG. 9, with the tailgate ramp 100 fully folded, the taillights 114 face the rear.

The vehicle 40 may optionally be provided without any tailgate ramp 100. In this case, a separate ramp may be used instead of the tailgate ramp 100, in the loading sequence to the sub-deck 102 as described below, or by rolling the camera crane directly up onto the deck. It may also be possible to load a camera crane onto the vehicle using a fork lift, construction crane, or other lifting equipment, without the use of any ramp.

FIGS. 10-15 illustrate loading a camera crane 160 onto the transport vehicle 40. In FIG. 10, the camera crane 160 includes a telescoping arm 162 having a 73 foot (21 meter) reach, with about 60 feet (18 meters) of telescoping travel. The arm 162 weighs about 4000 lbs (1800 kg) excluding accessories. The arm is supported on the mobile base 164 at a position typically at least 9.5 feet (3 meters) above the ground GG. The mobile base 164 typically weighs about 5000 lbs (2200 kg). The center of gravity of the combination of the crane arm 162 and the mobile base 164, which together form the camera crane 160, accordingly may be close to 4.5 feet (1.4 meters) above the ground. Of course, the transport vehicle 40 can be used to transport various other types of camera cranes as well.

Figure 17:
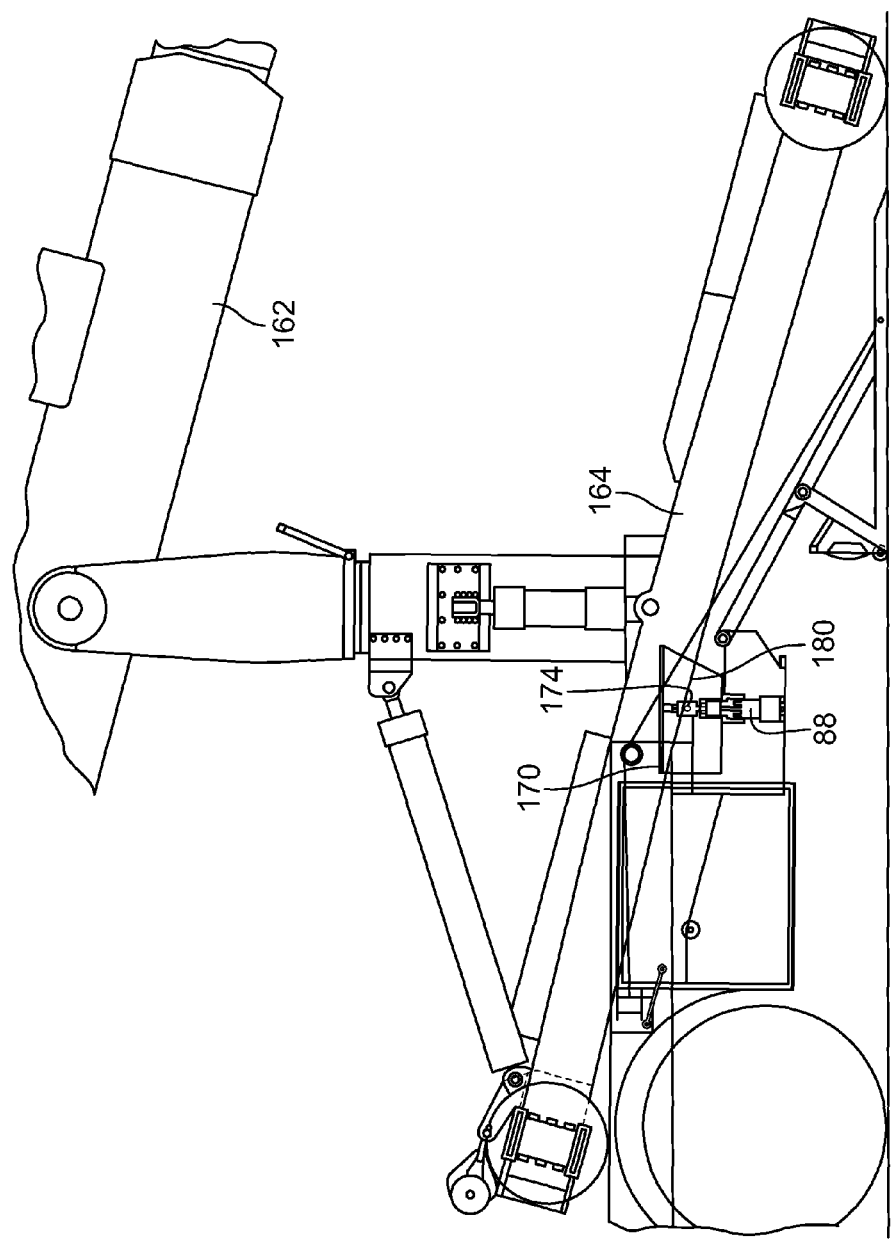
FIG. 17 is an enlarged side view of the camera crane loading sequence occurring between the positions shown in FIGS. 12 and 13.

Referring to FIG. 10, with the tailgate ramp 100 deployed, a crane cable 142 attached to a crane winch 140 is attached to the camera crane 160. The tailgate ramp 100 extends up from the ground GG to the sub-deck 102, which is below (at a lower height above the ground) than the deck 90. The winch 140 pulls the camera crane 160 up the tailgate ramp 100, until the front wheels 166 of the mobile base 164 are positioned on the back elevator 88, as shown in FIG. 11. In the design shown, the back elevator 88 is provided as two a pair of hydraulic actuators aligned under the rollways 96. As shown in FIG. 17, a top plate 170 may be attached onto the upper end of each actuator, to provide a support surface for the wheels of the mobile base 164. The front elevators 86 may have the same design.

With the front wheels 166 on the rear elevators 52, the winch 140 is stopped. The rear elevators 88 are then actuated to lift the front wheels 88 up to the level of the deck 90, as shown in FIG. 12. The winch 140 is then used to further pull the camera crane 160 onto the deck 90. The rear elevators 88 are lowered back down to the original position on the sub-deck 102. This may be achieved by using actuators which exert force in both the up and down directions.

Figure 18:
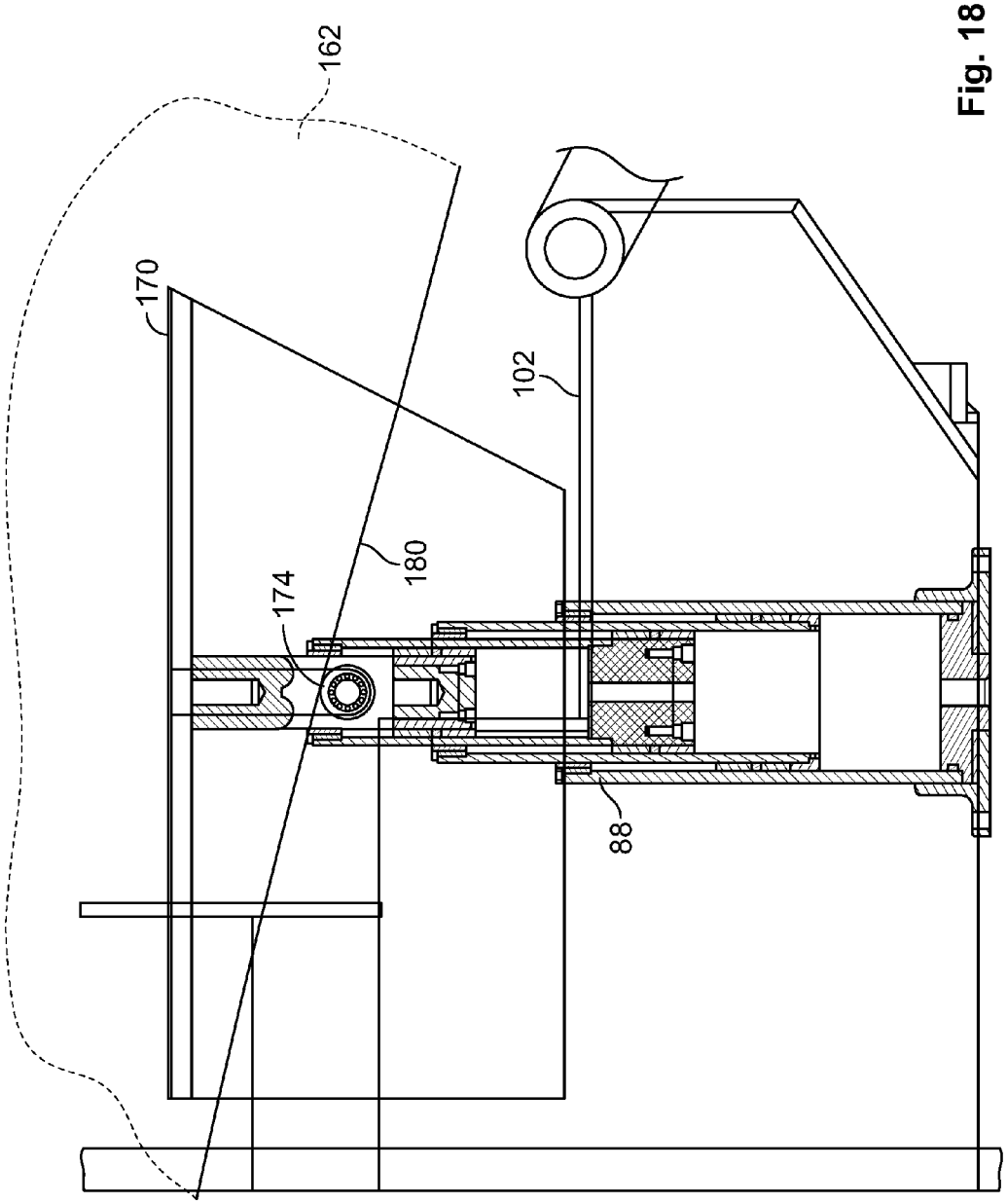
FIG. 18 is an enlarged detail view of the rear elevator shown in FIG. 17.

However, a single action actuator may also be used, with the down movement of the rear elevators achieved using the weight of the camera crane. Referring momentarily to FIGS. 17 and 18, a roller 174 may be provided on each end of the retraction bar 172 (shown in FIG. 4) extending laterally across the sub-deck 180 and connecting the two rear elevators 88. As the mobile base 164 moves over the rear elevators, bottom surfaces 180 of the mobile base contact the rollers 174 and act to push the rollers and retraction bar 172 down, returning the rear elevators back to the down position shown in FIG. 15. The winch 140 continues pulling the camera crane 160 onto the vehicle 40 until the front wheels 166 are positioned on top of the front elevators 86, which are in the up position, as shown in FIG. 13. The winch 140 and the elevators 86 and 88 may be controlled via a control panel near the back end of the vehicle 40. In an alternative design, the winch 140 may be omitted and the camera crane 160 moved onto the vehicle 40 using the drive system of the camera crane.

The front and rear elevators are spaced apart in the front-to-back direction of the vehicle by the same dimension as the front-to-back wheelbase of the mobile base 164. Consequently, with the front wheels 166 on the front elevators 86, the back wheels 168 of the camera crane are positioned on top of the rear elevators 88. As shown in FIG. 13, the camera crane 160 at this position is at an inclined angle, because the front wheels 166 are at the level of the deck 90 or the rollways 96, while the back wheels 168 are at the level of the sub-deck 102, approximately 8-24 or 12-18 inches below the deck 90.

Figure 15:
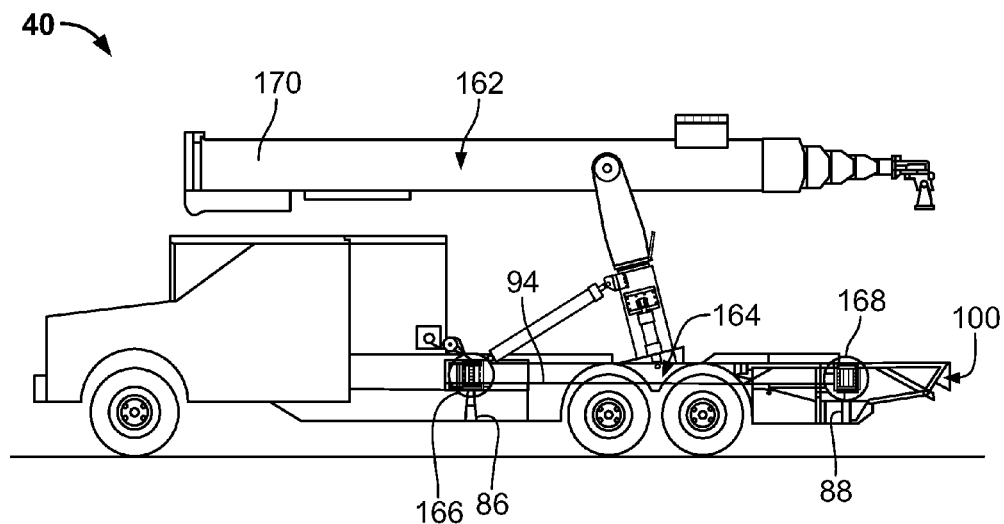

The front elevators 86 are then lowered, moving the crane from the interim loading position shown in FIG. 13 to the final transport position shown in FIG. 14. As this lowering movement occurs, the bottom surface of the chassis of the mobile base 164 comes to rest on below deck support surfaces or hard points on the vehicle 40. The wheels 166 and 168 of the mobile base 164 move into open recesses below the deck 90 and are unloaded, i.e., no longer carrying the weight of the camera crane 160. Consequently, the camera crane 160 may be rigidly supported on the vehicle 40. Clamping devices may be used to lock the camera crane 160 in place in the position shown in FIG. 14. The tailgate ramp 100 is folded up, as shown in FIG. 15.

The vehicle 40 is then ready to transport the camera crane 160 via over-the-road or off-road routes. At the filming destination, the reverse sequence is followed to unload the camera crane 160, except that the mobile base 164 may be moved manually, or via its own drive and braking systems. The winch 140 may then optionally be used to slowly lower the camera crane down the tailgate ramp 100. Since the crane arm 162 is already installed on the mobile base 164, the camera crane 160 may be used without delay. In addition, the crane arm 162 may be balanced in advance by adding or removing static counterweights, based on the payload (i.e., the camera, camera accessories, and crane accessories, such as a remote control and/or gyro stabilized camera head, to be used in the filming sequence). This saves time and reduces the complexity of getting the camera crane 160 set up and ready for use at the filming location. It also allows the camera crane 160 to be set up and balanced beforehand, in an indoor location under controlled conditions.

Figure 16:
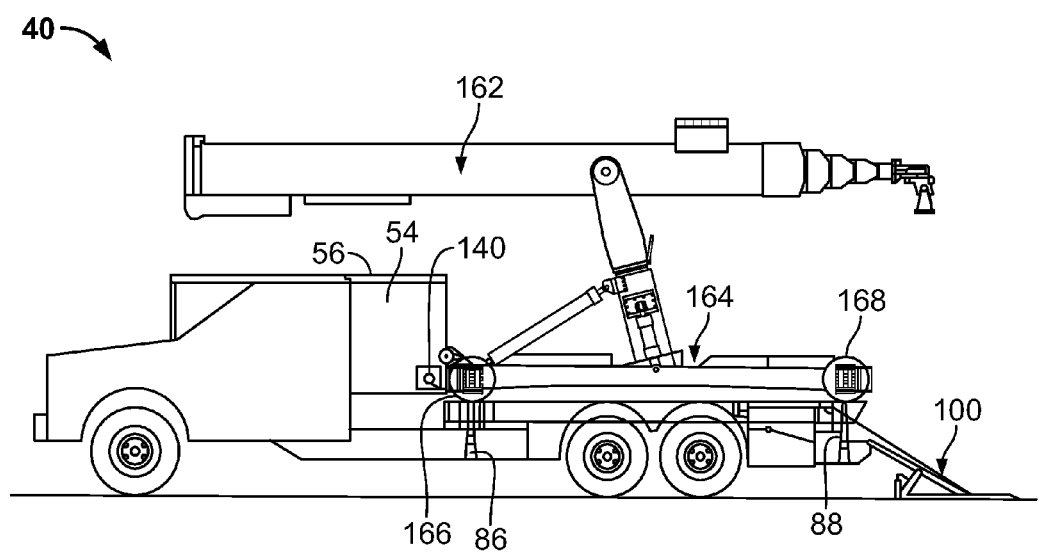
FIG. 16 is a side view provided for comparison to FIG. 15.

FIG. 16 shows the position of the camera crane 160 as it would be if loaded onto a convention flat bed truck, with the wheels 166 and 168 on the deck of the truck. In comparison, FIG. 15 shows the position of the camera crane 160 as loaded onto the vehicle 40. As shown, with the vehicle 40, the camera crane 160 is about approximately 8-24 inches (20-60 cm) or 12-18 inches (30-45 cm) below the position shown in FIG. 16. Consequently the center of gravity of the camera crane 160, i.e., the load on the vehicle 40, is correspondingly lowered. The loaded vehicle 40 is therefore more stable. In addition, since the camera crane 160 is supported on the structural support surfaces 94 of the vehicle 40, and not via its own wheels and suspension, the load does not shift as the vehicle makes turns or traverses uneven ground.

The vehicle 40 as shown in FIG. 2 may be used as a conventional camera car. Any openings in the deck 90 may be covered with hinged, sliding or removable plates, to provide a generally uninterrupted flat deck surface.

Figure 19:
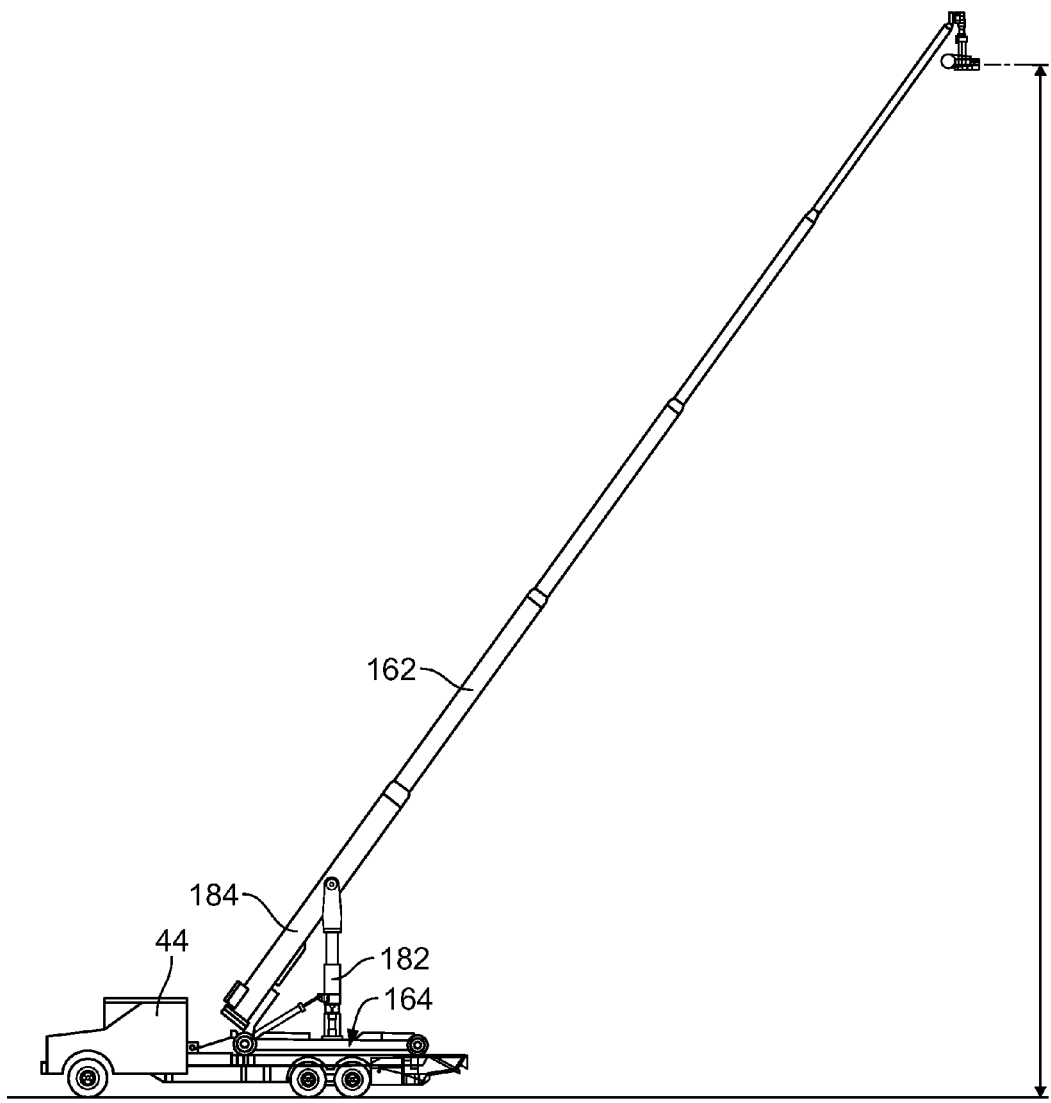
FIG. 19 is a side view of operation of the camera crane shown in FIG. 16 while the camera crane is on the vehicle shown in FIG. 2.

For some applications, the camera crane 160 may also be used while it is on the vehicle 40, as shown in FIGS. 16 and 19. To allow for a full range of motion of the crane arm 162 while the crane 160 is on the vehicle 40, the vehicle may be lengthened so that the back section 184 of the crane arm clears the cab 44 and any other equipment on the vehicle, such as the generator 54 and the generator cover or deck 56 shown in FIG. 16. Alternatively, the generator 54 and the generator deck 56 may be removed to provide greater clearance. Raising the vertical position of the crane arm 162 also adds clearance. The crane arm may be raised by moving the front and rear elevators to the up position, as shown in FIG. 16.

If the camera crane 160 has a height-adjustable center column 182, the center column may be used to further raise the crane arm 162, as shown in FIG. 19. The length of the back section 184 of the crane arm 162 (from the pivot attachment on the center column to the back end of the crane arm) may also optionally be made shorter by shifting the location of the pivot attachment, as described in U.S. Pat. No. 8,03,742, incorporated herein by reference. Although more counter weights will be needed to balance the crane arm 162 in this configuration, shortening the back section 184 can help to allow for a full range of movement, as shown in FIG. 19. The added weight of the additional counter weights may be partially or even fully offset however by removing the generator 54 from the vehicle 40. Hold down straps or bars may used to securely lock the camera crane 160 down onto the vehicle 40.

Referring still to FIG. 19, the camera crane 160 may be used while on the vehicle 40, to support a camera during filming, where the filming sequence requires movement of the camera over rough or uneven ground. The camera crane 160 can also be moved off of the vehicle 40 and used independently of the vehicle 40. If the mobile base 164 of the camera crane 160 is electrically powered, the camera crane 160 can be used indoors, or in other locations inaccessible or otherwise barred to the vehicle 40. With conventional camera cranes, switching from outdoor to indoor use typically requires moving the crane arm 162 from an outdoor mobile base or vehicle (such as an over the road truck) to an indoor mobile base (such as an electric stage crane base). This is a time consuming operation. It also requires using a fork lift truck or construction crane. The combination of the camera crane 160 and the vehicle 40 as described above allows for both outdoor and indoor use, without the need to switch the crane arm 162 between mobile bases.

Thus, a novel camera crane transport vehicle has been shown and described. Various changes and substitutions may of course be made without departing from the spirit and scope of the invention. The invention, therefore, should not be limited, except by the following claims, and their equivalents.

The invention claimed is:

1. A camera crane carrier, comprising:
   a vehicle including a chassis having a front end and a back end;
   a deck on the chassis between the back end and the front end of the chassis;
   a front elevator at a forward position on the deck;
   a front elevator plate on the front elevator, with the front elevator plate separate from the deck, and the front elevator plate movable only in a vertical direction perpendicular to the deck via actuation of the front elevator;
   a back elevator plate on a back elevator, with the back elevator plate separate from the deck, and the back elevator plate also movable only in a vertical direction perpendicular to the deck via actuation of the back elevator; and
   a folding tailgate ramp pivotally attached onto a back end of the vehicle and extendible from the back end of the vehicle to the ground, the folding tailgate ramp comprising a link plate, with a front end of the link plate pivotally attached to the vehicle, and a back end of the link plate pivotally attached to a triangle frame, and further comprising taillights supported on the triangle frame.

2. The camera crane carrier of claim 1 with the front elevator plate movable vertically from a first position level with the deck, to a second position at least 10 inches below the deck.

3. The camera crane carrier of claim 1 adapted to carry a camera crane having a longitudinal wheelbase LL, and with the front elevator plate spaced apart from the back elevator plate by a dimension LL.

4. The camera crane carrier of claim 1 with the front elevator comprising front left and front right lifting actuators, and with the back elevator comprising back left and back right lifting actuators.

5. The camera crane carrier of claim 4 with all of the lifting actuators comprising hydraulic actuators connected to a hydraulic system on the vehicle, and with the hydraulic system adapted to operate the front actuator separately from the back actuators.

6. The camera crane carrier of claim 1 further comprising first and second rear axles on the vehicle substantially centered between the front and back elevators.

7. The camera crane carrier of claim 1 with the deck comprising a substantially continuous flat surface when the front and back elevator plates are level with the deck.

8. The camera crane carrier of claim 1 with the triangle frame including a ground plate, and with a bottom surface of the ground plate on the ground when the folding tailgate ramp is unfolded, and with the bottom surface of the folding tailgate ramp facing up and substantially co-planer with the deck, when the folding tailgate ramp is folded up.

9. The camera crane carrier of claim 1 with the triangle frame including a ground plate and further comprising a tailgate winch on the vehicle having a cable attached to the ground plate.

10. The camera crane carrier of claim 1 further including a sub-deck at the back end of the chassis at a fixed position below the deck, and with the back elevator on the sub-deck.

11. The camera crane carrier of claim 10 with the folding tailgate ramp pivotally attached to the sub-deck.

12. The vehicle carrier of claim 1 further including a retraction bar attached to the back elevator, and a left roller on a left side of the retraction bar and a right roller on a right side of the retraction bar.

13. A camera crane carrier, comprising:
a vehicle including a chassis having a front end and a back end;
a deck on the chassis between the back end and the front end of the chassis;
a front elevator at a forward position on the deck;
a front elevator plate on the front elevator, with the front elevator plate separate from the deck, and the front elevator plate movable only in a vertical direction perpendicular to the deck via actuation of the front elevator;
a back elevator plate on a back elevator, with the back elevator plate separate from the deck, and the back elevator plate also movable only in a vertical direction perpendicular to the deck via actuation of the back elevator; and
a folding tailgate ramp pivotally attached onto the back end of the vehicle and extendible from the back end of the vehicle to the ground, with the folding tailgate ramp comprising a link plate, with a front end of the link plate pivotally attached to the vehicle, and a back end of the link plate pivotally attached to a triangle frame including a ground plate, and further comprising a tailgate winch on the vehicle having a cable attached to the ground plate.

14. The camera crane carrier of claim 13 further comprising taillights supported on the triangle frame.

15. The camera crane carrier of claim 13 further including a sub-deck at the back end of the chassis at a fixed position below the deck, and with the back elevator on the sub-deck.

16. The camera crane carrier of claim 13 with the ramp pivotally attached to the sub-deck.

\* \* \* \* \*